Figure 1:
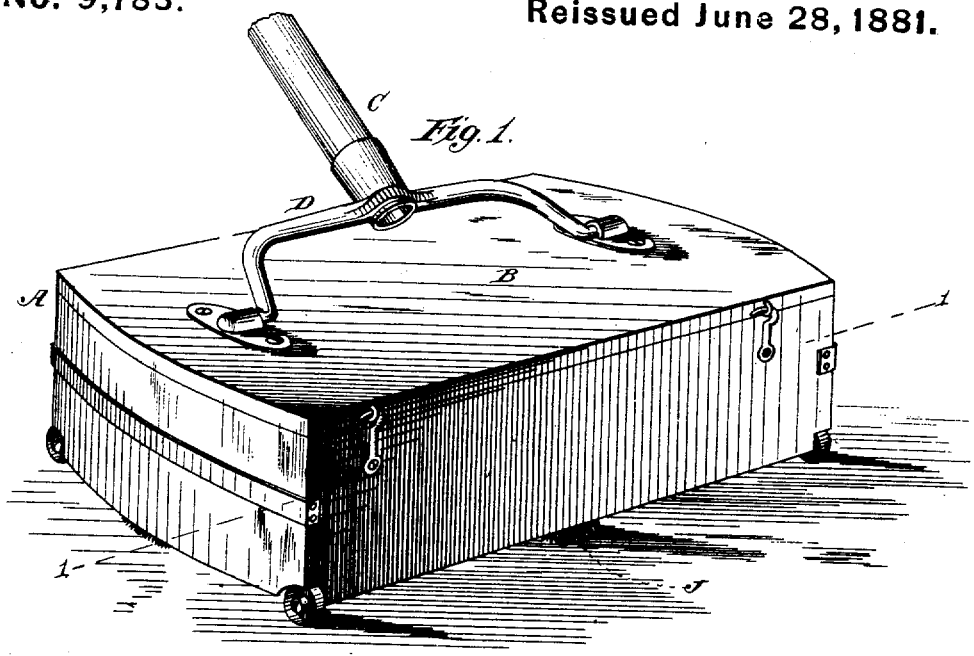

15. BRUSHING AND SCRUBBING,
& GEN
A 1
15-41.R
59

2 Sheets—Sheet 1.

M. R. BISSELL.
Carpet Sweeper.

No. 9,783.

Reissued June 28, 1881.

Witnesses.
Robert Everett
Albert H. Norris.

Inventor.
Melville R. Bissell.
By James L. Norris.
Attorney.

N. PETERS, Photo-Lithographer, Washington, D. C.

RUBBING,
EANING.

41

2 Sheets—Sheet 2.

M. R. BISSELL.

Carpet Sweeper.

No. 9,783. Reissued June 28, 1881.

*Witnesses.*
Robert Everett
Albert L. Norris.

*Inventor.*
Melville R. Bissell.
By James L. Norris.
Attorney.

N. PETERS, Photo-Lithographer, Washington, D. C.

UNITED STATES PATENT OFFICE.

MELVILLE R. BISSELL, OF GRAND RAPIDS, MICHIGAN.

CARPET-SWEEPER.

SPECIFICATION forming part of Reissued Letters Patent No. 9,783, dated June 28, 1881.

Original No. 182,346, dated September 19, 1876. Application for reissue filed November 22, 1880.

*To all whom it may concern:*

Be it known that I, MELVILLE R. BISSELL, a citizen of the United States, residing at Grand Rapids, in the county of Kent and State of Michigan, have invented certain new and useful Improvements in Carpet-Sweepers, of which the following is a specification.

The object of my invention is to provide a carpet-sweeper with a brush-shaft centrally supported within the casing, and one or more wheels centrally arranged within the casing in such relation to the brush-shaft as to rotate said shaft and serve as means for supporting the sweeper during the operation of sweeping, so that the sweeper, as an entirety, can be employed as usual, or its casing capable of being inclined on either side of its centrally-located supporting medium in passing over uneven surfaces, leaving the brush-shaft, with its brushing-surface, free to oscillate or be inclined on its bearings, and thus remain in contact with the floor or carpet, enabling the brush to remove and take up minute refuse matter and perform its work more perfectly than hitherto accomplished with that class of sweepers which employ a brush-shaft fixed in bearings at each end of the casing.

To this end it consists, first, in combining with a carpet-sweeper casing provided with receptacles for receiving and conveying sweepings a centrally-journaled brush-shaft operated by wheels, (one or more,) which also serve to support the sweeper during the operation of sweeping; second, in combining with a carpet-sweeper having receptacles for receiving and conveying sweepings wheels (one or more) journaled or pivoted centrally within the casing, for centrally supporting the sweeper in its movement during the act of sweeping, imparting motion to the brush-shaft, and permitting the tilting or inclination of the brush-shaft to either side of its center, as hereinafter more fully described; third, in combining with a carpet-sweeper having receptacles for receiving and conveying sweepings a brush-shaft arranged centrally within the casing, with wheels (one or more) journaled or pivoted centrally within the casing and connected with the brush-shaft, for imparting rotary motion to the same and for centrally supporting the sweeper in its movements during the operation of sweeping; fourth, in combining with the casing of a carper-sweeper, its brush-shaft, and its supporting or brush-driving wheels a housing fixed transversely and centrally in the casing for inclosing, protecting, and supporting the driving mechanism of the brush-shaft; fifth, in combining with the casing of a carpet-sweeper, its brush-shaft, and its supporting or brush-driving wheels a housing fixed transversely and centrally in the casing, for inclosing, protecting, and supporting the wheels (one or more) which support the sweeper during the operation of sweeping; sixth, in the combination, with the casing, the brush-shaft, and the central bearing of said shaft, of an adjusting-screw connected to said bearing and arranged to adjust the same vertically, for the purpose specified and claimed hereinafter.

The invention further consists in certain combinations and arrangements, as will hereinafter be more fully set forth and claimed.

Figure 2:
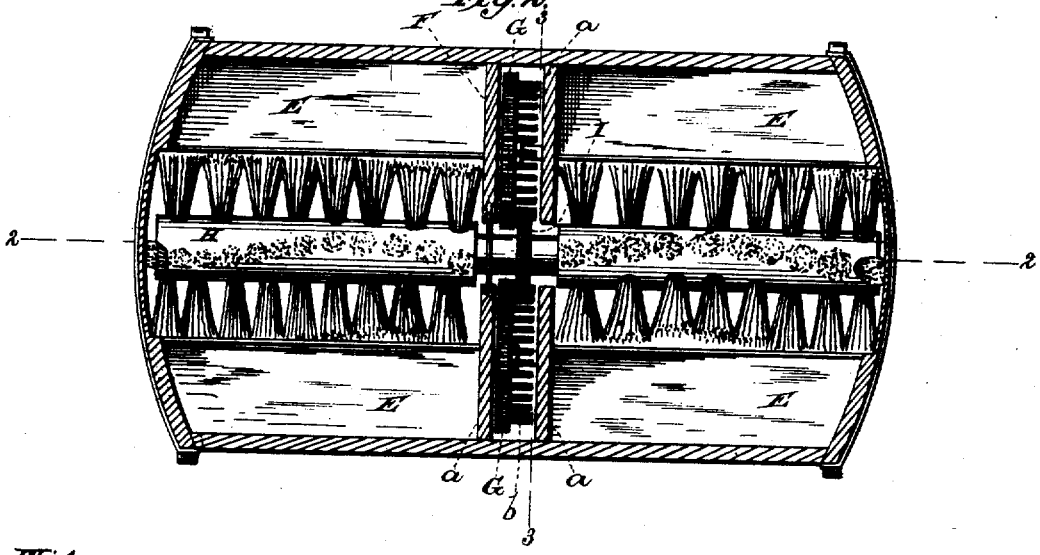
Figure 3:
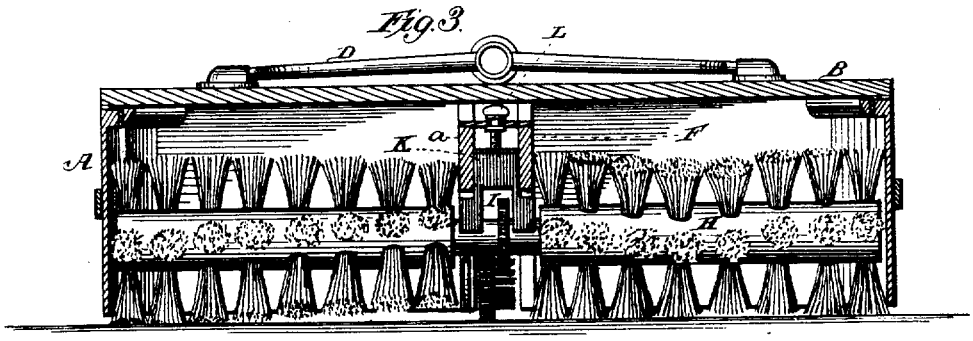
Figure 4:
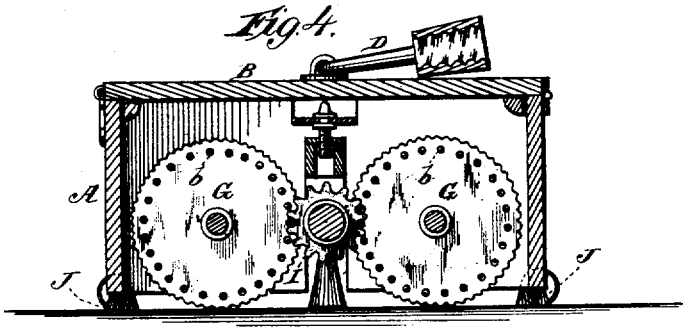
Figure 5:
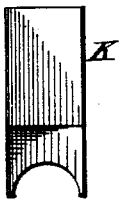
Figure 6:
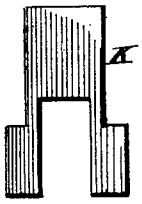
Figure 7:
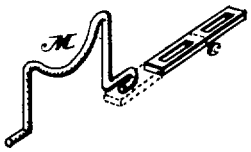

In the drawings, Figure 1 is a perspective view of my improved carpet-sweeper. Fig. 2 is a horizontal section of the same, taken on the line 1 1 of Fig. 1, showing the interior of the sweeper. Fig. 3 is a longitudinal section taken on the line 2 2 of Fig. 2. Fig. 4 is a transverse section taken on the line 3 3 of Fig. 2. Figs. 5 and 6 represent side and edge views of the adjustable bearings, and Fig. 7 represents a detached view of the removable and adjustable slide for holding the brush-roller in position.

In the drawings, the letter A designates the casing of a carpet-sweeper, which is supplied with the usual door or cover, B, handle C, and bail D. Within the interior of the casing are arranged receptacles E for receiving and carrying the sweepings. The casing of the sweeper is shown as constructed with curved ends, in order to facilitate and admit of sweeping close to the sides of rooms or furniture.

Transversely and centrally within the casing is fixed a housing, F, for inclosing, protecting, and supporting the wheels (one or more) which impart rotary motion to the brush-shaft, presently to be described, and for supporting the sweeper during the operation of sweeping. This housing is shown as being composed of side pieces, *a a*, which are sufficient distances apart to receive the driving and supporting mechanism above described.

G represents the brush-driving and sweeper-supporting wheels, of which there may be one or more journaled or pivoted within the housing, for centrally supporting the sweeper in its movement during the operation of sweeping.

The brush-shaft H, with its brushing-surface, is seated within the casing in the direction of its length, and has its bearing or support at or about the center of the casing, in such proximity to the driving and supporting wheel or wheels as to be rotated thereby. The brush-shaft is shown as provided with a pinion, I, which meshes with side cogs or pins, *b*, on the side of the wheel or wheels G.

Tufts of bristles J are arranged upon the casing in front and rear of the central brush-driving and sweeper-supporting wheel or wheels, in order to brush dust and refuse matter away from the path of said wheel or wheels, in order to subject the same to the action of the brush.

The brush-shaft, as before stated, is centrally journaled within the casing, so as to be free to tilt or oscillate on its bearing, or to rise and fall independent of the casing, so that it can automatically adjust itself closely to the floor or carpet when the casing is inclined by the operator on either side of the central bearing for the purpose of sweeping uneven surfaces. The brush-shaft is retained in position at its center by a bearing-block, K, which is capable of vertical adjustment through the medium of a regulating-screw, L, connected with said block in such a manner as to lower or raise the brush to increase or decrease the brushing action or power of the brush upon the floor or carpet. This regulating-screw is situated above the brush-shaft, in line with the longitudinal center of its axis, so as to adjust said brush-shaft in a positive vertical line, and thus avoid any lateral movement of said shaft, for if such should occur there would be a liability of the bristles of the brush-shaft during its rotation to come in contact with the dust-receptacle.

A cross-bar, M, is connected with the housing, so as to hold the brush-roller in place, and said cross-bar may be confined in place by means of a removable slide, *c*, or in any other suitable manner, so as to be readily operated to admit of the removal of the brush-roller.

The construction of the wheel or wheels is such as is ordinarily used in carpet-sweepers, and said wheel or wheels serve not only as a supporting medium for the sweeper, but also as a driving medium for operating the brush-shaft. The supporting and transporting wheel or wheels being near the center of the brush-shaft, the casing may be tilted, inclined, or oscillated to adapt the brush to act upon uneven surfaces and be caused to press more upon one portion of the floor or carpet than on another, thus enabling the sweeper to gather small refuse matter and to sweep the floor or carpet more closely than with any other sweeper in use. The bearing being near the center of the brush-shaft, said shaft is free to play loosely at all stages during the operation of sweeping, and automatically partakes of a tilting motion independent of the casing, enabling it to adjust itself closely to the floor or carpet over which it is moved.

At each corner of the casing, on the under side, is a small friction-roller, as shown, and around the curved ends may be placed an elastic band to prevent the marring of the furniture.

In order to make the casing tight, I fit a strip of elastic material in its upper edge, the same being inserted in a beveled slot, so as to make a close-fitting joint when the cover is pressed down.

In order to admit of close sweeping next to the sides of furniture or the base-board of rooms, I recess each of the end walls of the casing on the inside, so as to permit tufts of bristles at each end of the brush-shaft to enter said recesses, securing a brushing nearly equal to the entire length of the casing of the sweeper, and said recesses are of such a size or capacity as to allow of a free uninterrupted rotation of the bristles therein, and to permit the ends of the brush-shaft to move vertically therein.

Having thus described my invention, what I claim, and desire to secure by Letters Patent, is—

1. The combination, in a carpet-sweeper casing provided with receptacles for receiving and conveying sweepings, of a centrally-journaled brush-shaft and one or more wheels, arranged to transmit motion to the brush-shaft and to carry the sweeper during the operation of sweeping, substantially as described.

2. The combination, with the brush and casing of a carpet-sweeper having receptacles for receiving and conveying sweepings, of wheels (one or more) journaled or pivoted centrally within the casing, for centrally supporting the sweeper in its movements during the act of sweeping, and for imparting motion to the brush-shaft and permitting the tilting or inclination of the brush to either side, substantially as described.

3. The combination, with the brush and casing of a carpet-sweeper having receptacles for receiving and carrying sweepings, of a centrally-supported brush-shaft, wheels (one or more) journaled or pivoted within the casing, for centrally supporting the sweeper in its movements during the act of sweeping and for imparting motion to the brush-shaft, substantially as described.

4. In a carpet-sweeper having receptacles for receiving and conveying sweepings, the combination of a brush-shaft, supported longitudinally and centrally within the casing, with wheels (one or more) journaled or pivoted centrally within the casing, and connected with the brush-shaft for imparting rotary motion to the same, and arranged for centrally supporting the sweeper in its movement during the operation of sweeping.

5. The combination, with the casing of a carpet-sweeper and its centrally-supported brush-shaft, of a housing fixed transversely and centrally within the casing, for inclosing, protecting, and supporting the driving mechanism of the brush-shaft.

6. In combination with the casing of a carpet-sweeper and its brush-shaft, a housing constructed and applied centrally on the inside of the casing of the sweeper, for inclosing, protecting, and supporting the wheels (one or more) which centrally support the sweeper during the operation of sweeping.

7. The combination, with the casing, the brush-shaft, and the central bearing of said shaft, of the adjusting-screw connected with said bearing and arranged to adjust the same vertically, substantially as described.

8. The combination of the driving-wheels, pinion, and brush-shaft, having its bearing near the center, substantially as and for the purpose described.

9. In a carpet-sweeper, the brush-shaft having a central bearing, with no end bearings, for the purpose described.

10. The combination, with the casing and the brush having a central space between its divisions or partitions provided with bristles, of the tufts or brushes (one or more) arranged in transverse line with the said space, substantially as and for the purpose set forth.

In testimony whereof I have hereunto set my hand in the presence of two witnesses.

MELVILLE R. BISSELL.

Witnesses:
JAMES L. NORRIS,
JAMES A. RUTHERFORD.